United States Patent [19]

Yokoi et al.

[11] Patent Number: 5,297,949
[45] Date of Patent: Mar. 29, 1994

[54] ANNULAR MEMBER FORMING APPARATUS

[75] Inventors: Takashi Yokoi; Yukihiko Hoso, both of Kodaira, Japan

[73] Assignee: Bridgestone Corporation, Tokyo, Japan

[21] Appl. No.: 933,311

[22] Filed: Aug. 21, 1992

Related U.S. Application Data

[62] Division of Ser. No. 814,459, Dec. 30, 1991, Pat. No. 5,167,892.

[30] Foreign Application Priority Data

Dec. 29, 1990 [JP] Japan .................. 2-416173

[51] Int. Cl.⁵ .................. B29C 65/78; B29C 69/00
[52] U.S. Cl. .................. 425/297; 425/315; 425/375; 425/382.3; 264/148
[58] Field of Search .................. 425/375, 376.1, 323, 425/382.3, 447, 449, 297, 315, 319, 263, 264, 265, 266, 267, 268; 264/148, 316, DIG. 40

[56] References Cited

U.S. PATENT DOCUMENTS

| | | | |
|---|---|---|---|
| 2,030,211 | 2/1936 | Hulse | 264/DIG. 40 |
| 2,041,432 | 5/1936 | Roth | 425/308 |
| 2,303,554 | 12/1942 | Humphreys | 264/316 |
| 2,478,199 | 8/1949 | Lyon | 425/375 |
| 2,499,397 | 3/1950 | Lyon | 264/316 |
| 2,648,098 | 8/1953 | McElligott | 264/148 |
| 2,774,992 | 12/1956 | McElligott | 264/148 |
| 3,243,848 | 4/1966 | Miller et al. | 425/319 |
| 3,326,145 | 6/1967 | Austin | 425/447 |
| 3,433,182 | 3/1969 | Thompson | 425/319 |
| 4,076,785 | 2/1978 | Schmidt | 264/210.1 |
| 4,198,367 | 4/1980 | Burrell | 264/142 |
| 4,888,074 | 12/1989 | Pocknell | 264/152 |
| 4,913,645 | 4/1990 | Daouse et al. | 425/375 |
| 4,971,544 | 11/1990 | Schneeberger | 264/210.1 |
| 5,069,849 | 12/1991 | Wain | 264/152 |

FOREIGN PATENT DOCUMENTS

| | | |
|---|---|---|
| 019994 | 12/1980 | European Pat. Off. . |
| 0313506 | 4/1989 | European Pat. Off. . |
| 1-314151 | 12/1989 | Japan . |
| 314600 | 7/1929 | United Kingdom . |

Primary Examiner—Jay H. Woo
Assistant Examiner—Duane S. Smith
Attorney, Agent, or Firm—Sughrue, Mion, Zinn, Macpeak & Seas

[57] ABSTRACT

An apparatus for forming an annular member simply with high accuracy, for example, a side tread and bead filler having a height in the radial direction comparatively larger than its thickness as a constituent member of a tire. A material, for example, a soft and fragile raw rubber at a high temperature is directly extruded through a mouthpiece of an extruder onto a rotating disc-like lower mold so as to adhere onto it. The lower mold is able dividable into plural lower mold segments. An arcuately curved extruded material is formed on the lower mold in this manner. The extruded material is not deformed during being cooled because it is strongly restrained by the receiving surface of the lower mold on which the material adheres. The extruded material is then cut along the divided lines of the lower mold segments. Lower mold segments thus having arcuately extruded materials, respectively, are then transferred to a restoration position and gathered together to form the original lower mold. Thereafter, ends of the arcuately extruded materials are joined with each other to form an endless annular member.

9 Claims, 2 Drawing Sheets

FIG_1
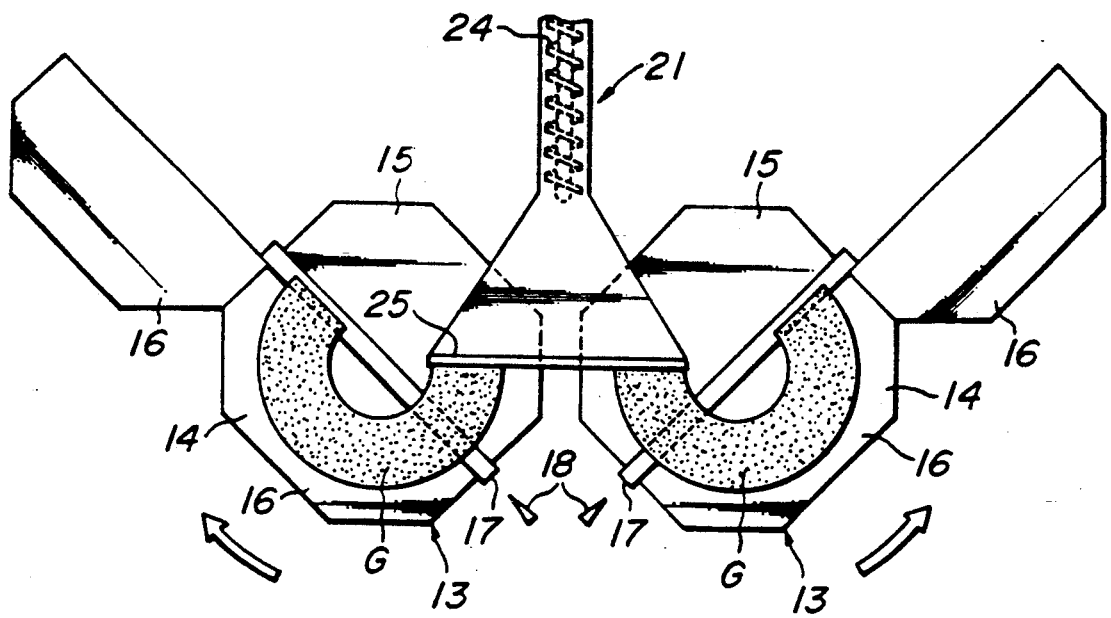
FIG_2
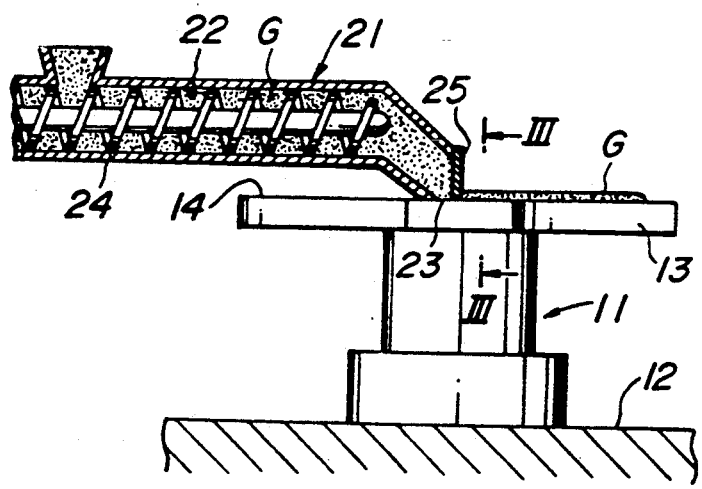

FIG_3
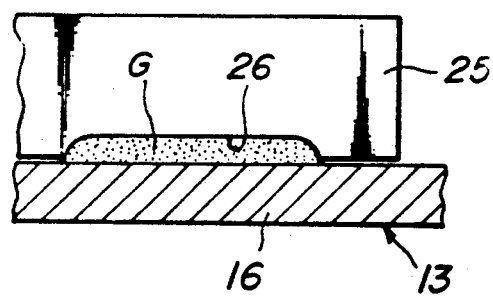
FIG_4
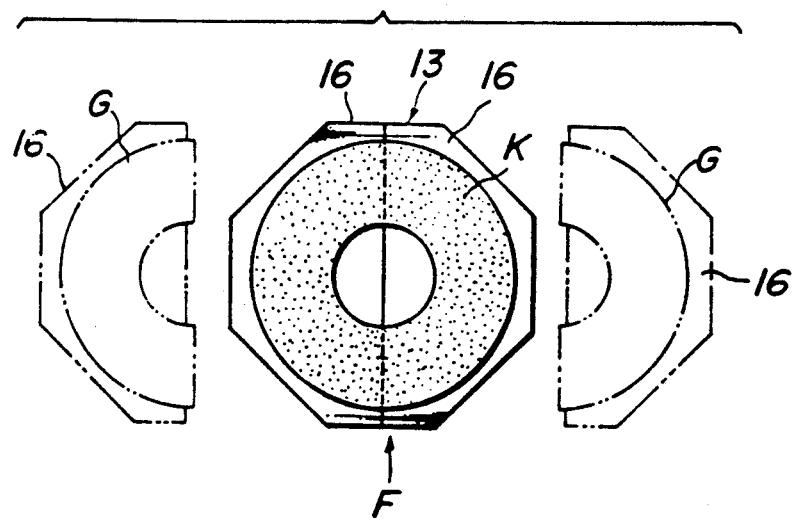

ANNULAR MEMBER FORMING APPARATUS

This is a divisional of application Ser. No. 07/814,459 filed Dec. 30, 1991, now U.S. Pat. No. 5,167,892 granted Dec. 1, 1992.

BACKGROUND OF THE INVENTION

This invention relates to an apparatus and a method for forming an annular member by the use of an extruder.

In general, in order to form pneumatic tire members, such as side treads and bead fillers, annular members are often used, which are made of annular rubbers having heights in their radial direction relatively larger than thicknesses in their axial directions. Such annular members have been formed in the following manner as disclosed, for example, Japanese Patent Application Laid-open No. 1-314,151. A rubber is extruded by an extruder to form belt-shaped rubbers which are then transferred to a conical-trapezoid mold by turning transferred directions with the aid of a plurality of rollers. The belt-shaped rubbers are then attached to the outer conical circumferential surface of the mold by means of attaching rollers.

In such a hitherto used apparatus or method for forming annular members, however, the belt-shaped rubbers are cooled without being restrained therearound after they are extruded from the extruder. Therefore, elongation or contraction of the rubbers are locally different which make it very difficult to obtain a desired contour (cross-sectional shape) of the rubbers. According to the prior art, moreover, the cooled belt-shaped rubbers are attached to the mold to obtain an annular member having a larger height in the radial direction relative to its thickness. Such an annular member has the outer circumference much larger than the inner circumference. Therefore, when both ends of the belt-shaped rubbers are joined to obtain an endless annular member, the belt-shaped rubbers are locally deformed from attached positions due to internal stresses therein so that the shape of the belt-shaped rubbers are changed in various ways. Moreover, the plural rollers are needed for turning the transferred directions and attaching the rubbers to the mold, which make the apparatus complicated in construction and expensive.

SUMMARY OF THE INVENTION

It is an object of the invention to provide an apparatus for forming an annular member, which is able to produce the annular member of a desired shape with ease and simple in construction and which is inexpensive.

It is another object of the invention to provide a method for forming an annular member, which can easily form the annular member of a desired shape and is carried out in simple and inexpensive.

In order to accomplish the first object, the apparatus for forming an annular member according to the invention comprises at least one lower mold having a receiving surface, rotating means for rotating the lower mold about the rotating axis perpendicular to the receiving surface, and an extruder having a mouthpiece arranged closely adjacent the receiving surface of the lower mold for extruding a material through the mouthpiece so as to adhere to the receiving surface of the rotating lower mold to form an arcuately curved extruded material on the receiving surface of the lower mold.

For the second object, the method for forming an annular member according to the invention comprises steps of rotating at least one lower mold having a receiving surface dividable into plural segments about the rotating axis perpendicular to the receiving surface, extruding a material through a mouthpiece of an extruder so as to adhere onto the receiving surface to form an arcuately curved extruded material on the receiving surface, cutting the extruded material substantially along divided lines of the lower mold, removing and transferring the lower mold segment having the extruded material adhering thereon from a forming unit, gathering together such lower mold segments each having the extruded material to restore the original lower mold, and joining ends of the extruded materials adhering to the lower mold segments to form an endless annular member.

In carrying out the invention, first the lower mold having the receiving surface is rotated about the rotating axis perpendicular to the receiving surface, while a material is extruded through the mouthpiece of the extruder to adhere to the receiving surface to form an arcuately curved extruded material thereon. The extruded material is progressively cooled with the lapse of time. During cooling, the extruded material adheres to the receiving surface of the lower mold, so that the material is strongly restrained by the receiving surface to maintain the shape of the material being extruded.

Moreover, the extruded material adheres to the receiving surface of the lower mold substantially at the same time as it is extruded or during so is soft and fragile at a high temperature so that it is not deformed even if the outer circumference is much longer than the inner circumference of the extruded material. Further, high accuracy roundness of the extruded material can be ensured because it is extruded and adheres to the receiving surface of the rotating lower mold. Moreover, the material is extruded from the extruder directly to the lower mold and adheres thereto. Therefore, the apparatus becomes simple in construction and inexpensive without requiring rollers for turning directions and attaching the material to the mold as in the prior art.

Thereafter, the extruded arcuate material on the receiving surface is cut substantially along divided lines of the lower mold dividable into plural lower mold segments. The lower mold segment having the extruded material adhering thereto is then removed from the forming unit and transferred to a restoration position where the plural lower mold segments having extruded materials adhering thereto are gathered together to restore or form the original lower mold. In this case, the gathered lower mold segments include the arcuate extruded materials adhering thereon, respectively, to form as a whole an annular member. Ends of the arcuate extruded materials adhering to the lower mold segments are joined with each other to form an endless annular member. Under the state of the arcuate extruded material adhering to the lower mold (lower mold segments), the cooling, transferring and joining are effected in this manner. Therefore, the annular member of a desired shape is readily obtained from the arcuate extruded materials without any deformation of the extruded materials.

The invention will be more fully understood by referring to the following detailed specification and claims taken in connection with the appended drawings.

BRIEF DESCRIPTION OF THE DRAWINGS

FIG. 1 is a schematic plan view illustrating one embodiment of the apparatus according to the invention;

FIG. 2 is a partially sectional schematic side view illustrating the apparatus shown in FIG. 1;

FIG. 3 is a sectional view of the part of the apparatus taken along the line III—III in FIG. 2; and FIG. 4 is a schematic plan view illustrating one process for joining arcuate materials in the method according to the invention.

DESCRIPTION OF THE PREFERRED EMBODIMENTS

Referring to FIGS. 1, 2 and 3, a pair of support means 11 are arranged on a floor 12, and horizontal lower molds 13 each in the form of an octagonal plate having at its top a flat receiving surface 14 are supported on the support means 11, respectively. The lower molds 13 are rotated about respective axes perpendicular to the receiving surfaces 14 in opposite directions shown by arrows (FIG. 1) by means of the support means as rotating means. Moreover, each of the support means 11 includes a vertically moving mechanism such as a cylinder, a screw shaft or the like so that the lower mold 13 is moved to maintain a constant distance to a mouthpiece of an extruder (hereinafter described). Each of the lower molds 13 is split or divided into plural segments along straight lines intersecting the rotating axis of the support means 11. In this embodiment, the lower mold 13 is divided into a pair of lower mold segments 15 and 16 of the same configuration. An elongated receiving plate 17 is arranged between the lower mold segments 15 and 16 and fixed to the support means 11. On the other hand, the lower mold segments 15 and 16 are detachably secured to the support means 11.

Cutters 18 are provided movably along the receiving plates 17, respectively. When an extruded material G (later described) has been extruded on the lower mold segment 15 or 16 of each of the lower molds 13 over whole angular range, each of the cutters 18 moves along the receiving plate 17 to cut the extruded material G along the divided line of the lower mold 13 in cooperation with the receiving plate 17. When the extruded material G has been cut by the cutter 18, the lower mold segment 15 or 16 supporting thereon the extruded material G is removed from the support means 11 and transferred to a restoring position by means of transfer means (not shown). A lower mold segment 15 or 16 not having an extruded material G is brought into position in place of the removed lower mold segment 15 or 16.

An extruder 21 is arranged above the lower molds 13 and includes therein a passage 22 through which a material G to be extruded passes. The material G in this embodiment is a raw rubber which is soft and fragile and at a high temperature. Outlets 23 of the passage 22 open immediately above the receiving surfaces 14, respectively. A screw 24 is provided in the passage 22 and is adapted to be rotated to feed the material G through the passage 22 toward the outlets 23. Moreover, the extruder 21 has mouthpieces 25 arranged in the proximity of or immediately above the lower molds 13. Each of the mouthpieces 25 is formed with an extrusion opening 26 of a predetermined shape (FIG. 3). The material G is extruded through the extrusion openings 26 of the mouthpieces 25 so that the two extruded materials G on the receiving surfaces 14 have a cross-section similar to the shape of the extrusion openings 26.

The operation of the apparatus of the embodiment according to the invention will be explained hereinafter.

First, the support means 11 are actuated to rotate the lower molds 13 about their rotating axes, while the extruder 21 is actuated to rotate the screw 24. As a result, a material G to be extruded is transferred toward the outlets 23 and urged against the receiving surfaces 14 of the lower molds 13 immediately before passing through the mouthpieces 25. The extruded material G is a raw rubber at a high temperature so that it adheres or sticks to the receiving surfaces 14 of the rotating lower molds 13. After the extruded material G is partially adhered to the rotating lower molds 13, the material G is extruded through the extrusion openings 26 of the mouthpieces 25 to be formed into a desired contour. At this time, high urging forces act upon the lower molds 13 from the extruded material G downwardly so that the lower molds 13 may be somewhat lowered or deformed to increase the distances between the mouthpieces 25 and the lower molds 13. In such a case, the vertically moving mechanisms of the support means 11 are actuated to raise the lower molds 13 by predetermined distances to correct the distances between the mouthpieces 25 and the lower molds 13 into set values. The constant contour (cross-sectional shape) of the material G extruded from the mouthpieces 25 is maintained in this manner.

In this case, moreover, the extruding speed of the material G and the rotating speed of the lower molds 13 are adjusted in order to assure the adhesion of the extruded material G to the receiving surfaces of the lower molds 13. The material G extruded from the extrusion openings is formed into arcuate or curved shapes by the rotations of the lower molds 13 in the directions of the arrows (in FIG. 1). Therefore, if the distances from the extrusion opening 26 to the rotating axes of the lower molds 13 are adjusted, radii of curvatures of the arcuately extruded material G can be modified. The extruded material G from the extruder 21 is progressively cooled with the lapse of time. The extruded material G is strongly restrained by the receiving surfaces 14 to maintain its shape during its cooling, because it adheres to the receiving surfaces 14.

Furthermore, the material G adheres to the receiving surfaces 14 of the lower molds 13 substantially the same time as the extrusion or in this embodiment immediately before the extrusion or during being soft and fragile at the high temperature. Therefore, the extruded material G is not deformed even if there is a great difference in length between inner and outer circumferences of the arcuately extruded material. Moreover, the material G is extruded against the receiving surfaces 14 of the lower molds 13 and adheres thereto so that the extruded materials are circularly formed in high roundness on the receiving surfaces 14 of the lower molds 13. Further, the material G is extruded from the extruder 21 directly to the lower molds 13 and adheres thereto. Therefore, the apparatus is simple in construction and inexpensive because any rollers are not needed for turning directions and attaching the material to the surface. Such rollers are otherwise required as in the prior art.

When the arcuately extruded materials G have adhered to the receiving surfaces of the lower mold segments, for example, segments 16 over the full angular extent, the cutters 18 are moved along the divided lines between the lower mold segments 15 and 16 or the receiving plates 17 to cut the extruded materials G. The lower mold segments 16 each having the extruded material G adhering thereto are then removed from the forming units by means of transfer means (not shown), while the same time empty lower mold segments 16 positioned on the sides of the lower molds 13 are transferred into the forming units by means of transfer means to form new lower molds 13 with the remaining lower mold segments 15, respectively. Thereafter, the plural (two in this embodiment) lower mold segments 16 removed from the forming units as described above are simultaneously transferred by the transfer means to the positions shown in phantom lines in FIG. 4. These two lower mold segments 16 are assembled in the restored positions F shown in solid lines to restore the original lower mold 13. At this time, as the arcuately extruded materials G are attached to the respective lower mold segments 16, these extruded materials G form as a whole an annular body.

The extruded materials G adhering to the respective lower mold segments are joined with their ends to form an endless annular member K made of the rubber having the height in the radial direction relatively larger than its thickness. In this case, in order to ensure a good joining of the ends of the extruded materials G, it is preferable to project both the ends of the extruded materials G from the lower segments 16 to their longitudinal direction because the proximities of the cut ends of the arcuately extruded materials G somewhat tend to shrink as they are cooled. According to the invention, the cooling, transferring and joining are effected in the state of the materials G adhering to the lower mold segments 15 or 16 so that the annular member K of a desired shape can be readily obtained without being deformed.

While the receiving surfaces 14 of the lower molds 13 are flat, and at the same time the mouthpieces 25 are formed with extrusion openings 26 to produce the extruded materials G having a desired contour, it should be understood in the present invention that only the receiving surfaces of the lower molds may be formed with recesses of predetermined shapes, or the receiving surfaces may be formed with recesses and the mouthpiece may be formed with extrusion openings to obtain extruded materials G of a desired contour. Moreover, the lower molds 13 may be conical or frustoconical instead of disc-shaped molds in the above embodiment. While the lower molds are divided into two lower mold segments 15 and 16, they may be divided into lower mold segments more than three.

As can be seen from the above description, the invention can readily obtain annular members in the form of desired shapes by the use of the apparatus simple in construction and inexpensive.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for forming an annular member, comprising at least one lower mold having a receiving top surface and comprised of at least two separable lower mold segments, a support means for rotatably supporting the lower mold, rotating means for rotating the lower mold about a vertical rotating axis, and an extruder having an extrusion opening arranged closely adjacent the receiving top surface of the lower mold for extruding a crude rubber material directly on the receiving surface from the opening to adhere and form an arcuately curved annular member of crude rubber on the receiving surface of the lower mold.

2. The apparatus as set forth in claim 1, wherein said lower mold segments are provided therebetween with an elongated receiving plate fixed to said support means for the lower mold.

3. The apparatus as set forth in claim 1, wherein there are provided at least two lower molds per one extruder.

4. The apparatus as set forth in claim 3, wherein the extruder comprises at least two extrusion openings each of which has a cross-sectional shape corresponding to a cross-section of the annular member and opens immediately above the receiving surface of the lower molds, respectively.

5. The apparatus as set forth in claim 1, wherein said lower mold is plate-shaped.

6. The apparatus as set forth in claim 1, wherein said lower mold is conical.

7. The apparatus as set forth in claim 1, wherein said lower mold is frustoconical.

8. The apparatus as set forth in claim 1, wherein said lower mold segments are detachably secured to the support means.

9. The apparatus as set forth in claim 2, wherein a cutter is provided for movement along the receiving plate.

* * * * *